(12) United States Patent
Terashima et al.

(10) Patent No.: US 7,133,169 B2
(45) Date of Patent: Nov. 7, 2006

(54) APPARATUS EQUIPPED WITH REMOVABLE SCANNER UNIT

(75) Inventors: Hitoshi Terashima, Unoke-machi (JP);
Kunihiko Ohmi, Unoke-machi (JP);
Satoshi Ishida, Unoke-machi (JP);
Tomohisa Sano, Unoke-machi (JP);
Hiroshi Yamagishi, Unoke-machi (JP);
Taketoshi Sawada, Unoke-machi (JP);
Yoshiki Tsuchiyama, c/o PFU Limited, Nu-98-2, Aza-Unoke, Unoke-machi, Kahoka-gun, Ishikawa 929-11 (JP);
Satoshi Kirita, Unoke-machi (JP);
Hitoshi Yoshio, Unoke-machi (JP);
Terunobu Ohue, Kawasaki (JP)

(73) Assignee: Yoshiki Tsuchiyama (JP)

( * ) Notice: Subject to any disclaimer, the term of this patent is extended or adjusted under 35 U.S.C. 154(b) by 380 days.

(21) Appl. No.: 09/881,529

(22) Filed: Jun. 14, 2001

(65) Prior Publication Data
US 2003/0095296 A1 May 22, 2003

Related U.S. Application Data

(62) Division of application No. 08/964,257, filed on Nov. 4, 1997.

(30) Foreign Application Priority Data

Nov. 5, 1996 (JP) ............................................. 8-292722
Nov. 5, 1996 (JP) ............................................. 8-292829

(51) Int. Cl.
*H04N 1/04* (2006.01)
*H04N 1/23* (2006.01)
*B65H 5/22* (2006.01)

(52) U.S. Cl. ........................ 358/498; 358/296; 271/3.14

(58) Field of Classification Search ................. 358/498, 358/296, 488, 496, 1.12, 1.1, 1.18; 101/2, 101/37, 232, 272; 271/3.14, 8.1, 9.08, 9.02, 271/9.01

See application file for complete search history.

(56) References Cited

U.S. PATENT DOCUMENTS

368,259 A   8/1887   Warren (Continued)

FOREIGN PATENT DOCUMENTS

CA   2106253   3/1994

(Continued)

OTHER PUBLICATIONS

Logitech, Inc. 1993 ScanMan Power Page, Logitech 1993.
Logitech, Inc. 1995 PageScan Color, Logitech 1995.
Omron –HS 200 Product Information Omron corporation.

*Primary Examiner*—Dov Popovici
(74) *Attorney, Agent, or Firm*—McGlew & Tuttle, PC

(57) ABSTRACT

A scanner-equipped apparatus includes a combination of a base unit such as a printer unit, personal computer or word processor incorporating a printer unit and a scanner unit. The printer unit and the scanner unit can operate as automatic sheet feeder type apparatus, respectively. The scanner unit can be used as a handy scanner in the state detached from the base unit. The basic unit and the scanner unit are disposed substantially in upstanding posture in parallel with each other, wherein the scanner unit is removably combined with the base unit so that the scanner unit can be used as the handy scanner. A sheet transporting path for the scanner is formed between confronting surfaces of the base unit and the scanner unit. The sheet feeding mechanism for the scanner unit is so implemented as to be used intact as a driving mechanism for the handy scanner. The scanner-equipped apparatus can be realized inexpensively in a simplified mechanical structure while ensuring enhanced manipulatability.

10 Claims, 9 Drawing Sheets

U.S. PATENT DOCUMENTS

| | | |
|---|---|---|
| 4,652,937 A | 3/1987 | Shimura et al. |
| 4,667,253 A | 5/1987 | Chen |
| 4,677,253 A | 5/1987 | Chen |
| 4,677,495 A | 6/1987 | Ito et al. |
| 4,899,228 A | 2/1990 | Sano et al. |
| 4,989,237 A | 1/1991 | Kotani et al. |
| 5,038,228 A | 8/1991 | Takada |
| 5,163,089 A | 11/1992 | Kotani et al. |
| 5,166,812 A | 11/1992 | Dow et al. |
| 5,182,450 A | 1/1993 | Pan |
| 5,274,477 A * | 12/1993 | Mori et al. .................. 358/498 |
| 5,321,485 A | 6/1994 | Nukaya |
| 5,359,435 A * | 10/1994 | Hayashi et al. .............. 358/498 |
| 5,412,205 A | 5/1995 | McVicar et al. |
| 5,412,490 A | 5/1995 | Kojima et al. |
| 5,475,503 A | 12/1995 | Ali-Safai et al. |
| 5,559,609 A * | 9/1996 | Yamada et al. .............. 358/400 |
| 5,567,068 A | 10/1996 | Egashira et al. |
| 5,579,099 A | 11/1996 | Nishiyama et al. |
| 5,579,129 A * | 11/1996 | Iwata et al. .................. 358/474 |
| 5,602,650 A | 2/1997 | Tamura et al. |
| 5,644,663 A | 7/1997 | Saito et al. |
| 5,651,623 A | 7/1997 | Stodder et al. |
| 5,663,811 A | 9/1997 | Shimizu |
| 5,710,634 A * | 1/1998 | Kuriyama et al. ........... 358/296 |
| 5,711,516 A | 1/1998 | Pan |
| 5,727,890 A | 3/1998 | Stodder et al. |
| 5,731,885 A * | 3/1998 | Nagahara ..................... 358/496 |
| 5,738,454 A | 4/1998 | Zepeda et al. |
| 5,739,923 A | 4/1998 | Kawahara |
| 5,884,117 A * | 3/1999 | Tanoue et al. .................. 399/1 |
| 5,889,597 A | 3/1999 | Ara et al. |
| 5,896,206 A * | 4/1999 | Kellogg ....................... 358/498 |
| 5,954,326 A * | 9/1999 | Gaarder et al. ............. 271/9.02 |
| 6,064,498 A * | 5/2000 | Taniguchi et al. ........... 358/498 |
| 6,113,207 A | 9/2000 | Nakano et al. |

FOREIGN PATENT DOCUMENTS

| | | |
|---|---|---|
| CN | 1121213 A | 4/1996 |
| EP | 0 333 173 A3 | 9/1989 |
| EP | 0 333 173 A2 | 9/1989 |
| EP | 0 333 173 A | 9/1989 |
| EP | 0 548 374 A | 6/1993 |
| EP | 0 548 374 B1 | 6/1993 |
| EP | 0 587 316 A1 | 3/1994 |
| EP | 0 685 958 A3 | 1/1995 |
| EP | 0 650 843 A2 | 5/1995 |
| EP | 0 683 449 A2 | 11/1995 |
| JP | 02-100457 A | 11/1937 |
| JP | 56-126852 | 10/1981 |
| JP | JU 58-127753 A | 8/1983 |
| JP | 61-251356 A | 11/1986 |
| JP | 62-25556 A | 2/1987 |
| JP | 62-30461 A | 2/1987 |
| JP | 62-082869 A | 4/1987 |
| JP | 62-082869 A | 4/1987 |
| JP | JU 62-77953 | 5/1987 |
| JP | 63-42275 A | 2/1988 |
| JP | JU 63-92457 | 6/1988 |
| JP | 63-197682 | 8/1988 |
| JP | JU 62-16758 | 1/1989 |
| JP | 64-16758 | 1/1989 |
| JP | 01-100564 U1 | 4/1989 |
| JP | 01-100564 A | 7/1989 |
| JP | 01-137660 | 9/1989 |
| JP | 01-137661 | 9/1989 |
| JP | 01-235465 | 9/1989 |
| JP | 2-22958 A | 1/1990 |
| JP | JU 2-51453 A | 4/1990 |
| JP | 02-100457 A | 4/1990 |
| JP | 2-100457 | 4/1990 |
| JP | 2-226958 A | 9/1990 |
| JP | 3-3030 | 1/1991 |
| JP | 03-053069 U1 | 3/1991 |
| JP | 3-95029 | 4/1991 |
| JP | 03-053069 A | 5/1991 |
| JP | 03-123363 U1 | 5/1991 |
| JP | 5-185659 A | 7/1991 |
| JP | 03-123363 A | 12/1991 |
| JP | 04-150551 A | 2/1992 |
| JP | 4-117764 A | 4/1992 |
| JP | 04-150551 A | 5/1992 |
| JP | 04-196746 A | 7/1992 |
| JP | 4-239452 | 8/1992 |
| JP | 4-298159 | 10/1992 |
| JP | 4-314256 | 11/1992 |
| JP | 4-315362 A | 11/1992 |
| JP | 05-5464 | 1/1993 |
| JP | 05-005464 A | 1/1993 |
| JP | 05-005464 U1 | 1/1993 |
| JP | JU 5-18168 | 3/1993 |
| JP | 5-18168 | 3/1993 |
| JP | 5-185659 A | 7/1993 |
| JP | 05-316261 A | 11/1993 |
| JP | 06-62177 | 3/1994 |
| JP | 06-62178 | 3/1994 |
| JP | 06-62181 | 3/1994 |
| JP | 6-103208 | 4/1994 |
| JP | 06-105037 | 4/1994 |
| JP | 6-164834 | 6/1994 |
| JP | 07-41203 | 2/1995 |
| JP | 07-46367 | 2/1995 |
| JP | 07-46368 | 2/1995 |
| JP | 07-135550 A | 5/1995 |
| JP | 7-154530 | 6/1995 |
| JP | 07-181763 | 7/1995 |
| JP | 07-209927 | 8/1995 |
| JP | 7-250222 | 9/1995 |
| JP | 07-311838 | 11/1995 |
| JP | 08-51521 | 2/1996 |
| JP | 08-051520 A | 2/1996 |
| JP | 8-99728 | 4/1996 |
| JP | 08-133531 | 5/1996 |
| JP | 08-143189 | 6/1996 |
| JP | 08149257 | 6/1996 |
| JP | 08-149261 A | 6/1996 |
| JP | 8-163288 | 6/1996 |
| JP | 08-198480 | 8/1996 |
| JP | 8-223362 | 8/1996 |
| JP | 8-298575 A | 11/1996 |
| JP | 09102836 | 4/1997 |
| JP | 10-020595 | 1/1998 |
| JP | 10-107945 A | 4/1998 |
| KR | 127274 | 4/1994 |
| WO | WO 88/01123 | 2/1988 |
| WO | WO 93/01679 | 1/1993 |

* cited by examiner

APPARATUS EQUIPPED WITH REMOVABLE SCANNER UNIT

This application is a division of Ser. No. 08/964,257 filed Nov. 4, 1997.

BACKGROUND OF THE INVENTION

1. Field of the Invention

The present invention generally relates to an apparatus equipped removably with a scanner unit (also referred to as a scanner-equipped apparatus) in which a base apparatus or base unit such as a personal computer, a word processor or the like incorporating therein a printer unit is combined detachably with a scanner unit so that the scanner unit itself can also be used independently as a so-called handy scanner. By way of example, as a typical one of the scanner-equipped apparatus, there may be mentioned a printer/scanner combination apparatus which is composed of a printer unit and a scanner unit combined integrally and mutually detachably and which provides advantages that the space demanded for the installation of the apparatus can be reduced when compared with the space required for installing separately the printer unit and the scanner unit and that the printer/scanner combination apparatus can be manufactured at relatively low costs. Thus, the present invention is particularly concerned with a printer/scanner combination apparatus which includes a printer unit and a scanner unit combined detachably such that the scanner unit can be detached to be used as the handy scanner, to thereby enhance the utility of the scanning function while ensuring high manipulatabilty and serviceability for maintenance of the apparatus.

2. Description of Related Art

In recent years, in the field of data processing with the personal computer, there arises an increasing tendency of processing image, graphics and the like data, which is accompanied with rapid spreading of the scanner apparatus for fetching the image data.

In general, the personal computer system is comprised of a main body, a display unit, a keyboard, a printer, etc. Consequently, for the installation of the personal computer system, a considerably large space is demanded. Such being the circumstances, user who bought a scanner will often bother his or her head over the place where the scanner is to be installed. Furthermore, although the scanner is commercially available at remarkably low price at present, purchase of the scanner means not a little burden on the consumers.

Under the circumstances, there have been developed various scanner-equipped printer apparatuses in which a sensor is mounted on a carriage of the printer, wherein image reading operation is carried out by making use of the sheet feed mechanism of the printer for feeding an image document sheet (i.e., paper or the like sheet having text, a picture or graphics recorded thereon) in efforts to implement the scanner at low costs while mitigating the space demand for the installation of the scanner.

However, in the case of the conventional scanner-equipped printer apparatuses known heretofore, the sheet feeding mechanism is used in common for both the scanning function and the printing function. Consequently, it has been impossible to use both the functions at the same time. Further known is such a printer/scanner combination apparatus in which the reader unit provided for realizing the scanning function can be detached so as to be used as a so-called handy scanner. However, because the conventional reader unit includes no driving mechanism, the handy scanner can be operated only manually. In order to allow the handy scanner to operate automatically, it is required to provide a driving mechanism dedicated for the handy scanner. However, in the conventional apparatus, the driving mechanism for the handy scanner is left unused in the state in which the handy scanner is mounted on the printer unit. Thus, in the conventional printer/scanner combination apparatus, the efficiency of hardware utilization is low, which in turn means that the cost-performance of the conventional printer/scanner combination apparatus is poor.

SUMMARY OF THE INVENTION

In the light of the state of the art described above, it is an object of the present invention to provide a scanner-equipped apparatus which includes automatic sheet feeders separately for a base unit such as a printer unit or personal computer or word processor incorporating a printer unit and a scanner unit, respectively, so that the printing function and the scanning or reading function can be made use of independently and separately from each other.

Another object of the present invention is to provide a scanner-equipped apparatus which allows a scanner unit to be detached for use as a handy scanner which is capable of operating automatically with high efficiency.

In view of the above and other objects which will become apparent as the description proceeds, there is provided according to a general aspect of the present invention a scanner-equipped apparatus of such a basic structure in which a base unit such as a printer, personal computer, word processor or the like and a scanner unit are disposed substantially vertically or in upstanding posture in parallel with each other, wherein the scanner unit is removably or detachably combined with the base unit so that the scanner unit can be used as a handy scanner. A sheet transporting path (or document sheet transportation path) for the scanner is formed between confronting surfaces of the base unit and the scanner unit when they are combined each other. Besides, the sheet feeding mechanism for the scanner unit is so implemented as to be used intact as a driving mechanism for the handy scanner. Thus, the scanner-equipped apparatus according to the present invention can be realized in a simplified mechanical structure while ensuring enhanced manipulatability.

Fundamental features of the invention as well as preferred modes for carrying out the invention will be summarized below.

According to a general or basic feature of the present invention, the apparatus equipped removably with a scanner or the scanner-equipped apparatus includes a base unit and a scanner unit which can be removably mounted on the base unit. The base unit includes at least a controller, a part of sheet transporting mechanism and a scanner mounting means for mounting detachably the scanner unit. The scanner unit includes at least a reading unit, the remaining part of the sheet transporting mechanism and an engaging means adapted for engaging the scanner mounting means for thereby securing the scanner unit onto the base unit.

In a preferred mode for carrying out the invention, the scanner unit may be so implemented as to be capable of operating as a handy scanner in the state where the scanner unit has been detached from the base unit.

In another preferred mode for carrying out the invention, the base unit may be a printer unit.

In yet another preferred mode for carrying out the invention, the base unit may be of an automatic sheet feeding type and include a first sheet transporting path extending substantially vertically, while the scanner unit may be of an automatic sheet feeding type and include a second sheet transporting path extending substantially vertically, wherein the first and second sheet transporting paths are so disposed as to extend substantially in parallel and adjacent to each other.

In a further preferred mode for carrying out the invention, the sheet transporting path or document sheet transporting path for the scanner unit may be defined by confronting surfaces of the base unit and the scanner unit in the state in which the scanner unit is mounted on the base unit.

In a yet further preferred mode for carrying out the invention, the scanner-equipped apparatus may be so arranged that a pick roller is disposed at a location upstream of the second sheet transporting path of the scanner unit as viewed in the sheet transporting direction, while feed rollers are disposed at locations downstream of the second sheet transportation path for the scanner unit as viewed in the sheet transporting direction.

In a still further preferred mode for carrying out the invention, the pick roller may be made of a material having low hardness, wherein auxiliary rollers which are made of a material having high hardness may be disposed at sides of the pick roller, respectively, for thereby protecting the pick roller when the scanner unit is used as the handy scanner.

In yet further preferred mode for carrying out the invention, the auxiliary rollers may be disposed at locations outside of a reading region of the scanner unit.

In another preferred mode for carrying out the invention, the auxiliary rollers may be disposed in the vicinity of the pick roller, while grooves may be provided in a surface of the base unit facing in opposition to the auxiliary rollers.

In yet another preferred mode for carrying out the invention, a mark indicating a reading region may be provided at least on one of a front side portion and a rear side portion of the scanner unit, while a mark indicating a reading position may be provided on a lateral side portion of the scanner unit.

In still another preferred mode for carrying out the invention, a cable for electrically coupling the scanner unit to the base unit may be led out from a location positioned at a lateral surface of the scanner unit.

In a further preferred mode for carrying out the invention, a cable for electrically coupling the base unit to the scanner unit may be led out from a location positioned at a lower portion of a lateral surface of the base unit.

In a yet further preferred mode for carrying out the invention, the sheet transporting mechanism for the scanner unit may include feed rollers and a driving motor for driving the feed rollers so that the scanner unit can operate as a handy scanner of an automatically running type by using the feed rollers.

In a still further preferred mode for carrying out the invention, the base unit may include a printer unit, wherein a sheet transporting mechanism of the printer unit is comprised of a feed roller and a driving motor for driving the feed roller. Further, a sheet transporting mechanism for the scanner unit may be comprised of a sheet transporting roller and an encoder for detecting an amount of rotation of the sheet transporting roller so that the scanner unit can be operated as a manual type handy scanner.

In another preferred mode for carrying out the invention, either one of engaging portions of the base unit and the scanner unit may be constituted by a pivotal shaft for allowing the scanner unit to rotate or swing frontwards, while the other engaging portion may be implemented as a groove or alternatively as a recess for receiving and holding snugly the pivotal shaft.

In yet another preferred mode for carrying out the invention, the scanner-equipped apparatus may further include a lock means including a claw and a projecting member adapted to engage with the claw for thereby locking the scanner unit in the state mounted on the base unit.

In still another preferred mode for carrying out the invention, the scanner-equipped apparatus mentioned above may further be so arranged as to include a rotation limiting stopper means for preventing the scanner unit from swinging excessively frontwards upon detachment of the scanner unit from the base unit.

In still another preferred mode for carrying out the invention, the scanner-equipped apparatus may additionally be so arranged as to include a deviation preventing stopper means for preventing the scanner unit from displacing upwardly in the state in which the scanner unit is mounted on the base unit.

In still another preferred mode for carrying out the invention, the scanner-equipped apparatus described above may be so arranged as to include a sheet feeding means formed in a wedge-like shape as viewed in a vertical section by a pair of sheet guides disposed in opposition to each other so that a space defined between the pair of sheet guides becomes gradually narrower toward a sheet withdrawal port, and an offset means provided for at least one of the paired sheet guides for limiting stepwise the moving of the sheet toward the sheets withdrawal port.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 1A and 1B are views showing generally an outer appearance of a printer/scanner combination apparatus according to an embodiment of the present invention, wherein FIG. 1A shows the same in a state in which a reader unit is combined with a printer unit so as to be capable of operating as an automatic paper feed type scanner unit, and FIG. 1B shows the reader unit dismounted from the printer unit so that the reader unit can be used as a handy scanner on a guide plate;

DESCRIPTION OF THE PREFERRED EMBODIMENTS

Figure 1:
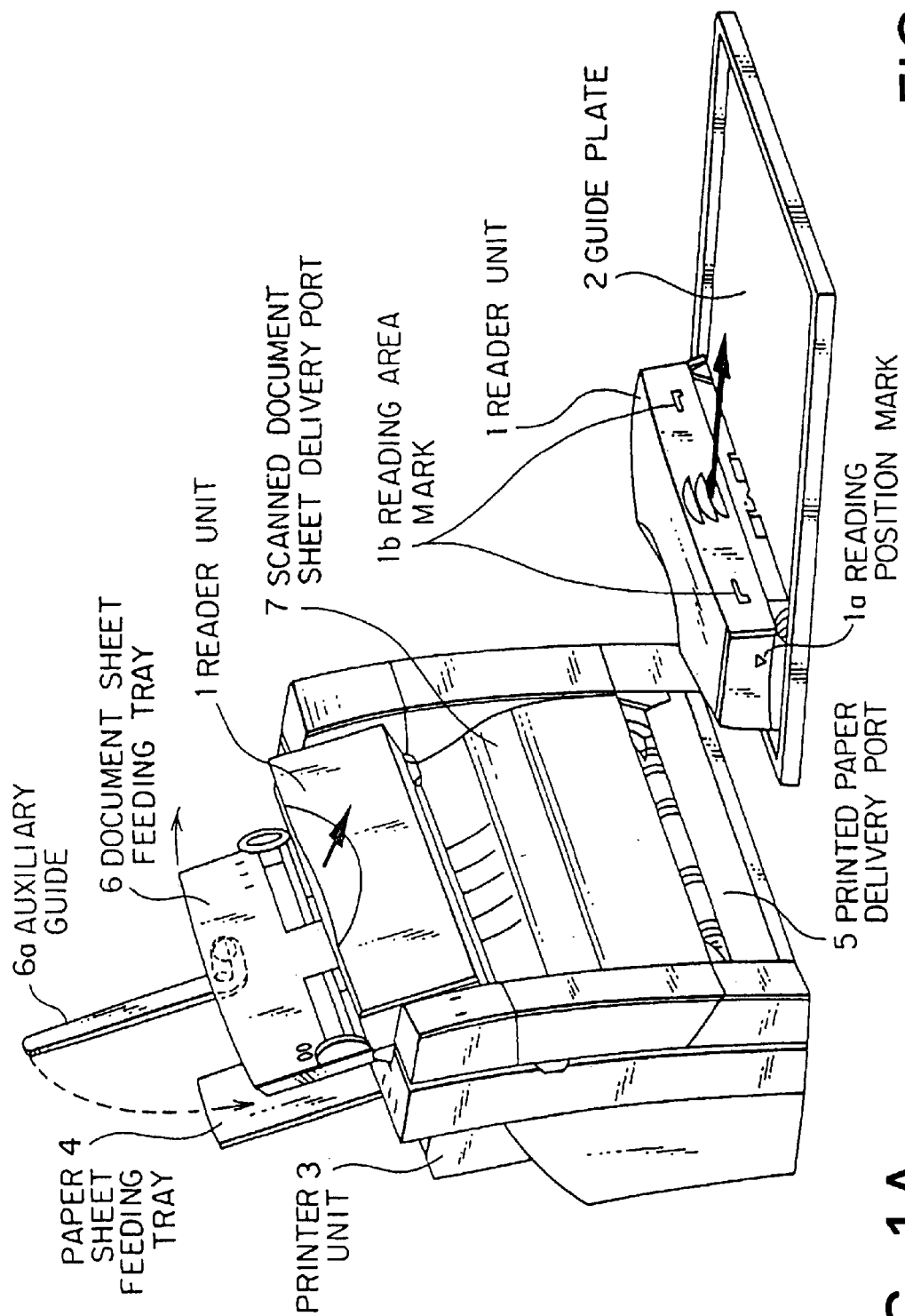

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "front", "rear", "lateral", "vertical", "clockwise", "counterclockwise" and the like are words of convenience and are not to be construed as limiting terms. Further, definition of terms used herein will be made. With the phrase "paper sheet", it is contemplated to encompass a blank sheet of paper and forms such as letterhead, labels, envelopes, etc. on which texts, graphics, pictures are to be printed. On the other hand, with the phrase "document sheet", it is intended to encompass such sheets or papers on which text, graphics, picture, etc, are visibly recorded. Of course, photograph and the like are equally covered by the phrase "document sheet".

FIGS. 1A and 1B are views showing generally an outer appearance of a printer/scanner combination apparatus according to an embodiment of the present invention, wherein FIG. 1A shows the same in the state in which a reader unit 1 is combined with a printer unit 3 so as to be capable of operating as an automatic paper feed type scanner unit, and FIG. 1B shows the same in the state in which the reader unit 1 is dismounted from the printer unit 3 so that the reader unit 1 can be used as a handy scanner on a guide plate 2.

In FIG. 1A, major portions of a mechanical structure of the printer unit 3 are located at the back side of the printer/scanner combination apparatus and thus they are invisible in this figure. The printer unit of the printer/scanner combination apparatus shown in FIG. 1A is implemented in a vertical standing structure, wherein a paper sheet is discharged through a printed paper delivery port 5 after having been printed by a printing means (not shown). The reader unit 1 is equipped with a pick roller, a reading window and feed rollers etc., at a rear surface (which forms a bottom surface when the reader unit 1 is used as the handy scanner). The scanner unit is implemented also in a substantially upstanding structure, wherein a document sheet fed from a document sheet feeding tray 6 is discharged from a scanned document sheet delivery port 7 after data (image data) on the document sheet have been read out by the reader unit 1. Parenthetically, an L-shaped auxiliary guide 6a is provided in association with the document sheet feeding tray 6 for the purpose of supporting a pile of document sheets of large sizes. The L-shaped auxiliary guide 6a may be so implemented as to be capable of supporting the document sheets of various sizes with a simplified structure.

Referring to FIG. 1B, in the state where the reader unit 1 is detached from the printer unit to be used as the handy scanner, as shown in the figure, the reader unit 1 is electrically coupled to the printer unit 3 by means of a cable (not shown) through which power supply as well as transmission of control signals and data can be realized between the reader unit 1 and the printer unit 3. The guide plate 2 is formed of a transparent material such as acrylic resin or the like and ordinarily adapted to be disposed on a document sheet. The reader unit 1 is so dimensioned as to be snugly fit within a guide frame of the guide plate 2. By moving slideably the reader unit 1 manually or automatically over the guide plate 2, a document sheet disposed beneath the guide plate is scanned, whereby the corresponding image data is read by the reader unit 1. A reading position mark 1a is indicated at a lateral side of the reader unit 1, while reading area marks 1b are provided at the front and rear sides, respectively. These marks serve to aid the user in positioning the reader unit 1 within the reading region of the document sheet with accuracy in particular when the original reading operation is to be carried out without resorting to the use of the guide plate.

Figure 2:
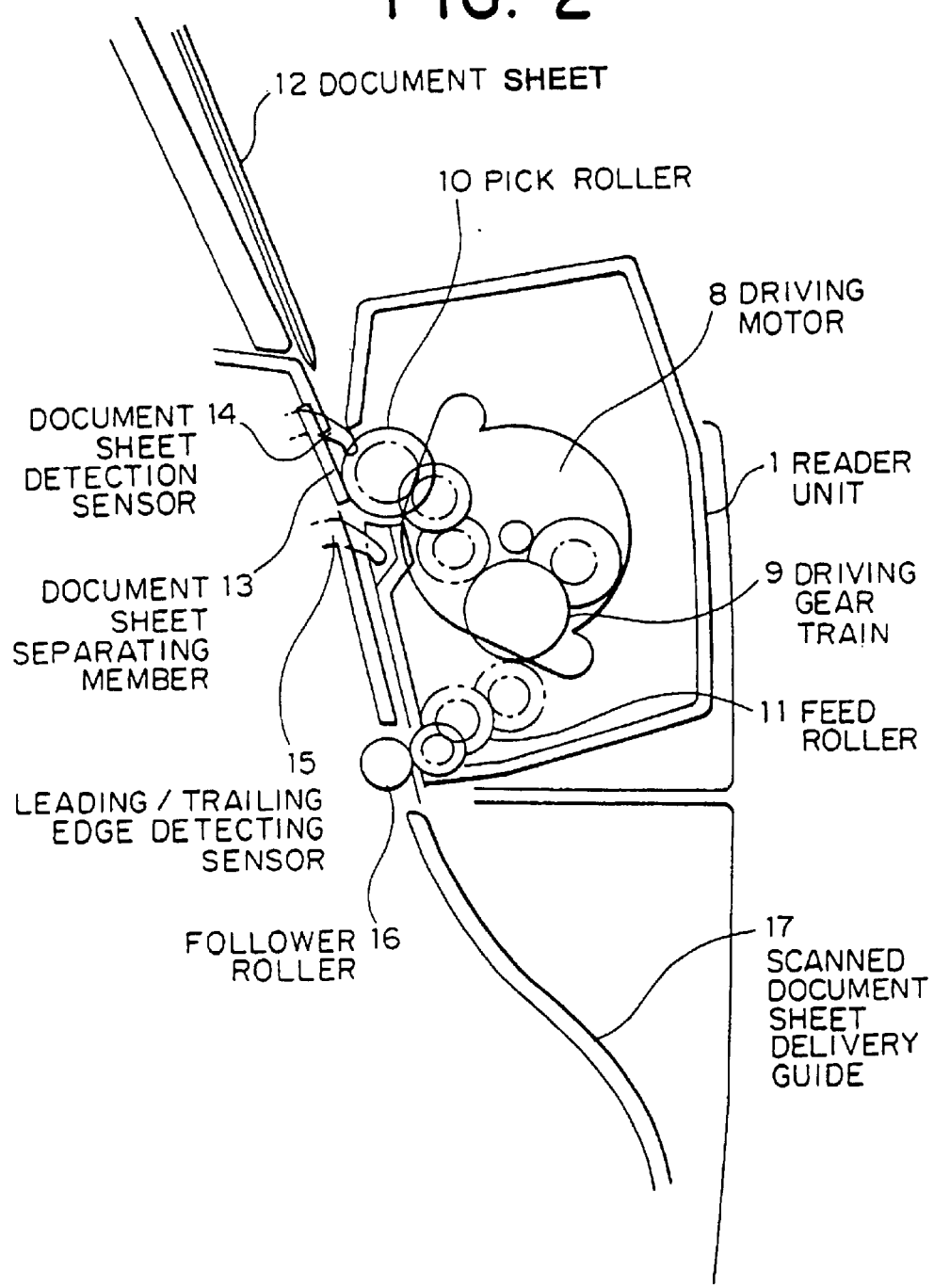
FIG. 2 is a schematic sectional view of a scanner unit showing a document sheet feeding mechanism for the reader unit.

FIG. 2 is a schematic sectional view of the scanner unit showing a document sheet feeding mechanism of the reader unit 1. A document sheet transportation path for the scanner unit is formed between the printer unit and the reader unit 1 when the reader unit 1 is mounted on the printer unit. The reader unit 1 is equipped with a pick roller 10 and a feed roller 11 which are rotationally driven by a driving motor 8 through the medium of a driving gear train generally denoted by reference numeral 9. From a layer or pile of loose document sheets 12 placed on the document sheet feeding tray 6, a document sheet is withdrawn downwardly on a sheet-by-sheet basis through cooperation of the pick roller 10 and the document sheet separating member 13. The document sheet as withdrawn from the pile 12 is detected by a document sheet detection sensor 14 for making preparation for the data reading operation, which is followed by detection of the leading edge of the document sheet by a leading/trailing edge detecting sensor 15, whereupon image data reading operation is started. Subsequently, upon detection of the trailing edge of the document sheet, the image data reading operation is terminated. The feed roller 11 and a follower roller 16 cooperate to feed the scanned document sheet to a scanned document sheet delivery guide 17. In this conjunction, it should be mentioned that the scanned document sheet delivery guide 17 may be so implemented as to serve also as a cover for the printed paper delivery port 5 of the printer unit 3 shown in FIG. 1A.

Figure 3:
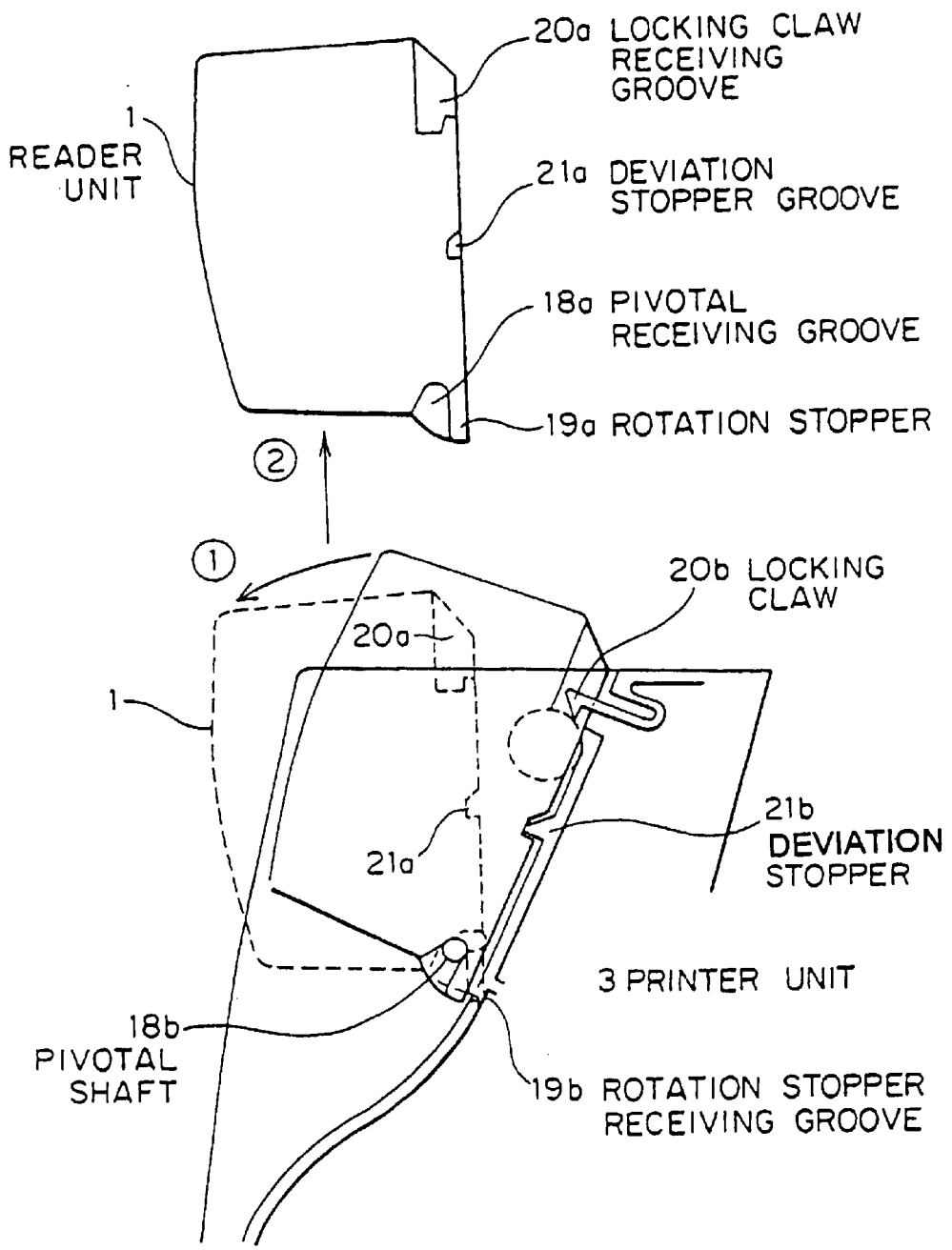
FIG. 3 is a developed view showing a mount/detachment mechanism for the reader unit.

FIG. 3 is a developed view showing a mount/removal mechanism for the reader unit to be used also as the handy scanner. As will hereinafter be described in detail by reference to FIGS. 4 and 6, the reader unit 1 is provided with a pivotal shaft receiving groove 18a, a locking claw receiving groove 20a and a stopper groove 21a, respectively, so that the reader unit 1 can be mounted removably on the printer unit at both sides of the reader unit 1 with high security. Correspondingly, the printer unit 3 is provided with a pivotal shaft 18b, a locking claw 20b and a stopper 21b which are adapted to engage with the pivotal shaft receiving groove 18a, the locking claw 20b and the stopper groove 21a of the reader unit, respectively.

The pivotal shaft receiving groove 18a has a bottom opened. Thus, the reader unit 1 can easily be dismounted from the printer unit 3 by rotating or turning the reader unit 1 in the counterclockwise direction, as indicated by an arrow ①, from the mounted state in which the reader unit 1 is inclined in the right-hand direction (indicated by a solid line) to a substantially vertical state (indicated by broken line) and then lifting upwardly the reader unit 1, as indicated by an arrow ②. Needless to say, the reader unit 1 can be mounted by carrying out the procedures indicated by the arrows ① and ② in the reverse order. In the state where the reader unit 1 is mounted on the printer unit 3, the reader unit 1 is prevented from the counterclockwise rotation so long as a force of predetermined magnitude is not applied because of the engagement between the locking claw receiving groove 20a and the locking claw 20b. Besides, in addition to the prevention of the counterclockwise rotation of the reader unit 1, upward move of the reader unit 1 in the mounted state is prevented owing to the mutual engagement of the stopper groove 21a and the stopper 21b. In this manner, the reader unit 1 can be mounted on the printer unit 3 with significantly high security. Moreover, since the rotation stopper 19a is formed integrally with the pivotal shaft receiving groove 18a of the reader unit 1 and extends downwardly, the rotation of the reader unit 1 can be limited to within a predetermined angular range because the rotation stopper 19a is received by the rotation stopper receiving groove 19b provided in association with the printer unit 3 upon counterclockwise rotation of the reader unit 1. In this manner, the reader unit 1 can positively be protected against accidental removal from the printer unit 3 due to inadvertent manipulation of the user.

Figure 4:
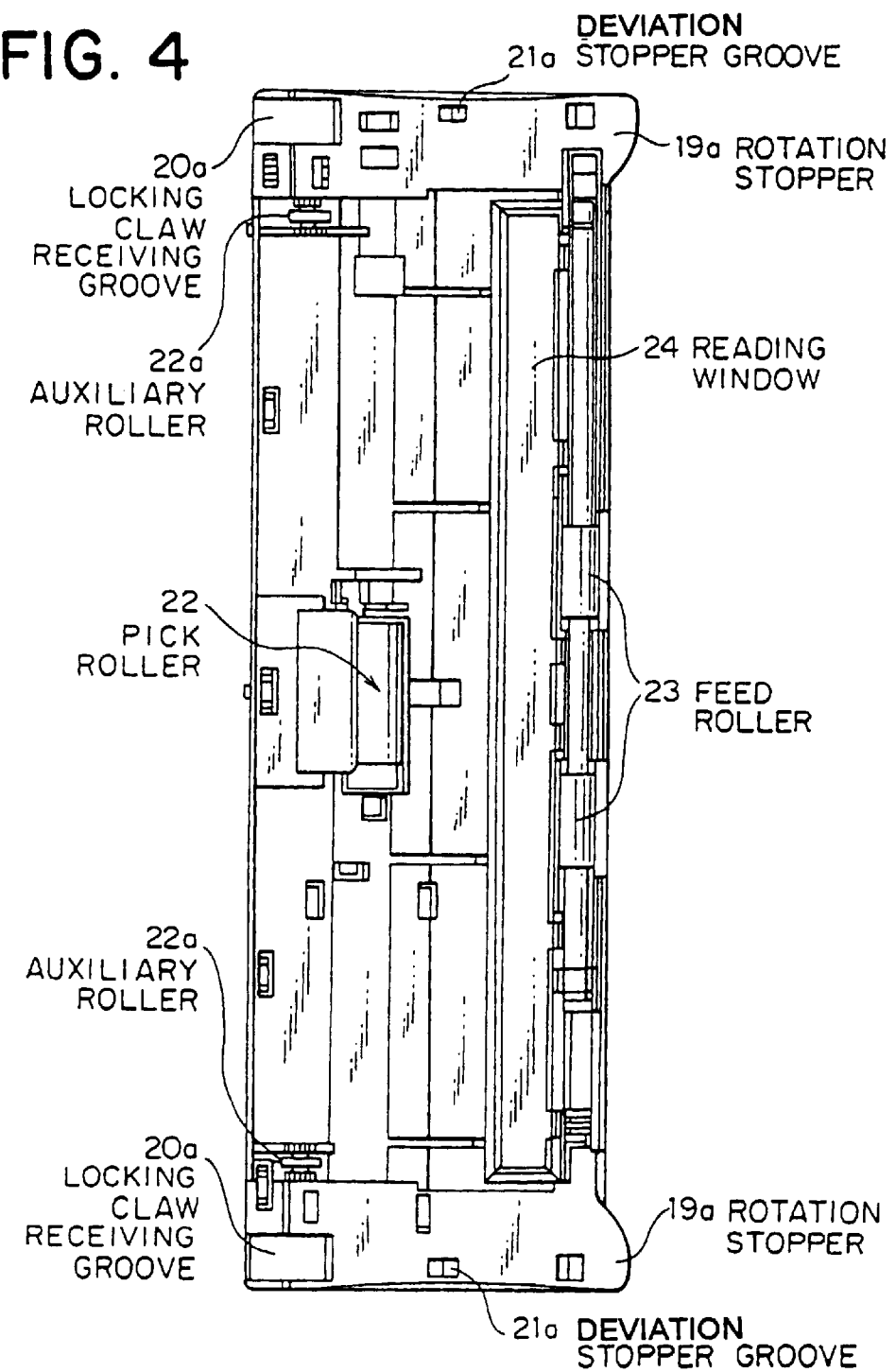
FIG. 4 is a bottom plan view of the reader unit.
Figure 5:
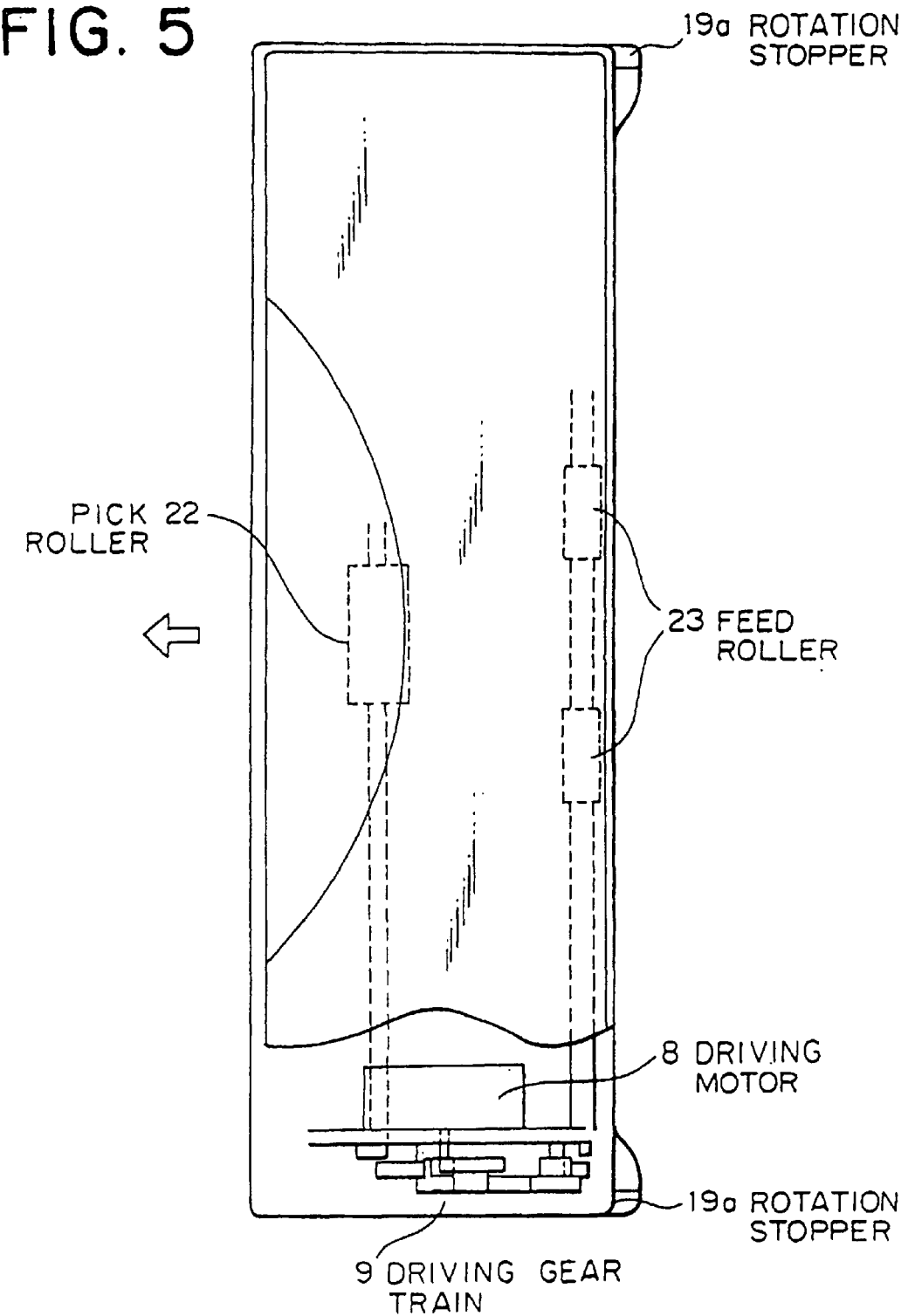
FIG. 5 is a top plan view of the reader unit.
Figure 6:
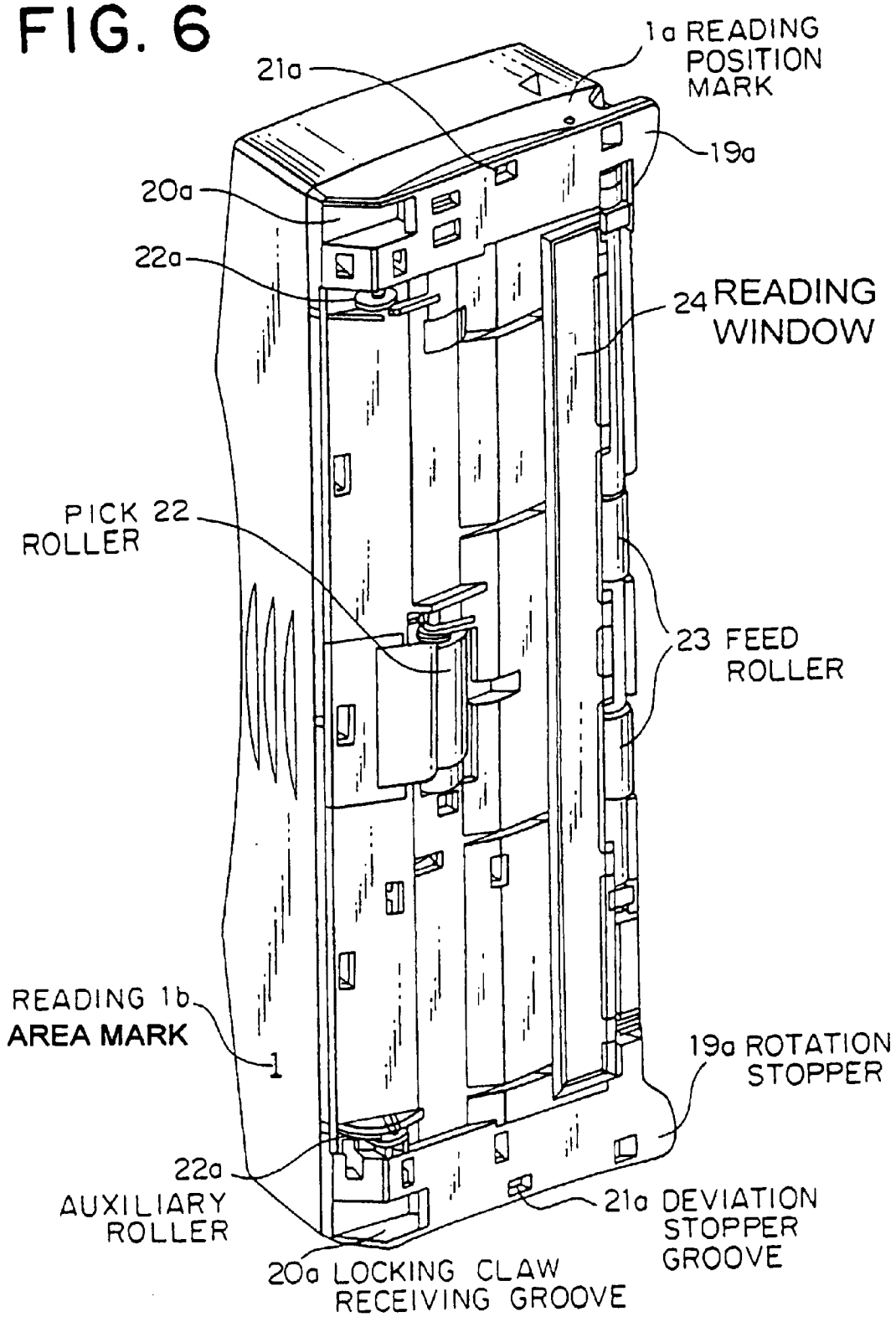
FIG. 6 is a perspective view showing the reader unit.

FIG. 4 is a bottom plan view showing the reader unit 1, FIG. 5 is a top plan view showing the same, and FIG. 6 is a perspective view thereof. As can be seen in FIG. 4, a pick roller 22 may be mounted on the bottom surface of the reader unit 1 at a front and center location, while a pair of feed rollers 23 are mounted at right and left positions, respectively, symmetrically relative to the rear center of the reading window 24. As can be seen in FIG. 5, each of the pick roller 22 and the feed rollers 23 is driven rotationally by the driving motor 8 by way of the driving gear train 9. Thus, when the reader unit 1 is used as the handy scanner, operation of the scanner can be performed automatically by making use of the rotational driving force or torque generated by the electric motor mentioned above. At this juncture, it should be mentioned that the pick roller 22 is usually made of a relatively flexible material of low hardness such as urethane resin. In that case, such situation may occur that the pick roller 22 is collapsed under the gravity of the reader unit and can not support the reader unit. In order to avoid such situation as mentioned above, there is provided an auxiliary rollers 22a made of a material of high hardness which serves for supporting the reader unit 1 so that the pick roller 22 does not apply excessive pressure onto the guide plate or the top surface of the document sheet. The auxiliary rollers 22a are disposed outside of the reading region 24 in order to protect the surface of the document sheet 12 against injury, as can be seen in FIG. 4. In this conjunction, it should be mentioned that the width of the auxiliary rollers 22a may be increased and mounted in the vicinity of the pick roller 22 so that the auxiliary rollers 22a can rotate freely coaxially with the pick roller 22.

Figure 7:
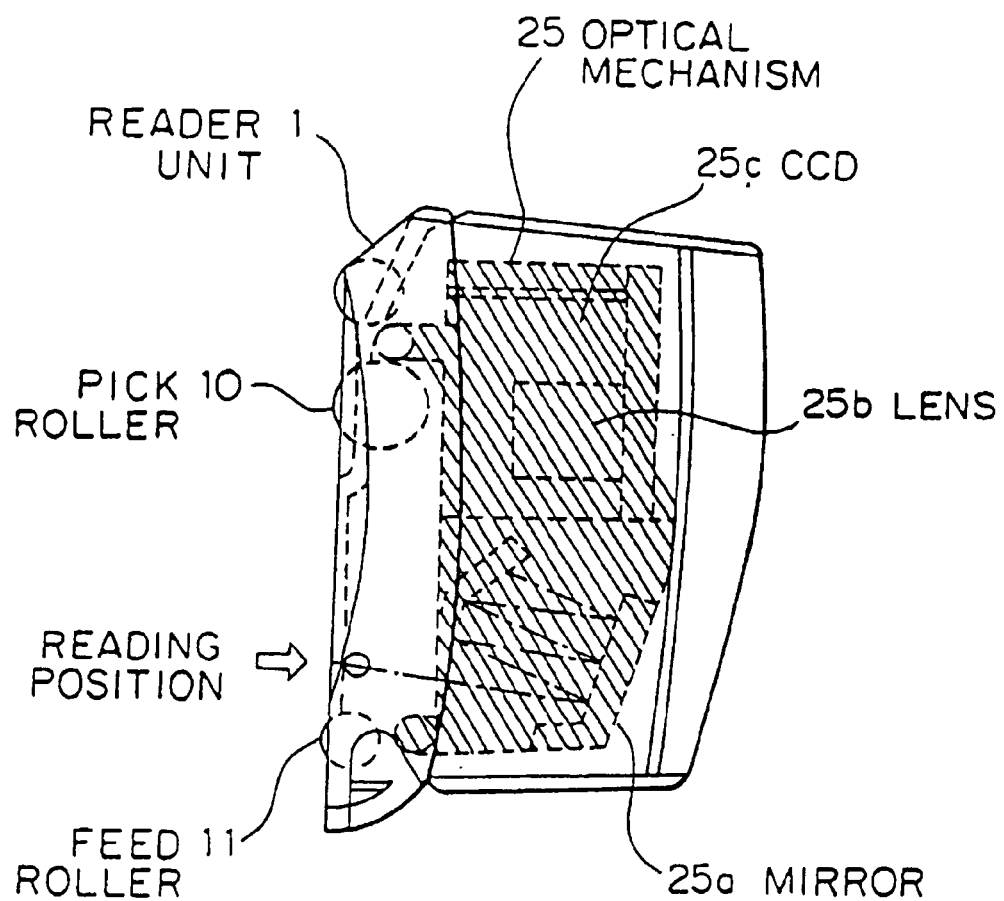
FIG. 7 is a sectional view showing schematically an optical mechanism incorporated in the reader unit.

FIG. 7 is a sectional view showing an optical mechanism 25 incorporated in the reader unit 1. The reading position is defined at the reading window 24 described hereinbefore by reference to FIG. 4. Light rays reflected from the document sheet to be read out and impinging into the optical mechanism through the reading window 24 reflections a number of times at a plurality of mirrors 25a to be collected by a lens 25b and received by a charge coupled device 25c which serves for converting the optical information into an electric signal.

At this juncture, it should be mentioned that the printer unit and the scanner unit of the printer/scanner combination apparatus according to the instant embodiment of the invention have sheet transportation paths (i.e., the paper sheet transportation path and the document sheet transportation path) provided separately for the printer unit and the scanner unit, respectively. Ordinarily, the printer unit is in the state where a pile of paper sheets is set or placed on the paper sheet feeding tray, while for the scanner unit, various kinds of the document sheets to be scanned or read out are set or placed on the document sheet feeding tray 6 every time the reading operation is desired. In this conjunction, if a transportation path is provided in common to the paper sheet and the document sheet for the printer unit and the scanner unit, as mentioned hereinbefore, troublesome work will be required for exchanging the paper sheets and the document sheets, incurring possibility of the paper sheets and the document sheet being erroneously mixed together.

Accordingly, in the case of the printer/scanner combination apparatus according to the instant embodiment of the invention, the paper sheet transportation path and the document sheet transportation path are provided separately for the printer unit and the scanner unit, respectively. Furthermore, it is desirable that the document sheets can be placed at the document sheet feeding tray 6 more easily when compared with the setting of blank paper sheets. To this end, the document sheet transportation path for the scanner unit should be disposed at a position near to the front side of the apparatus, as viewed in FIG. 1A.

Figure 8:
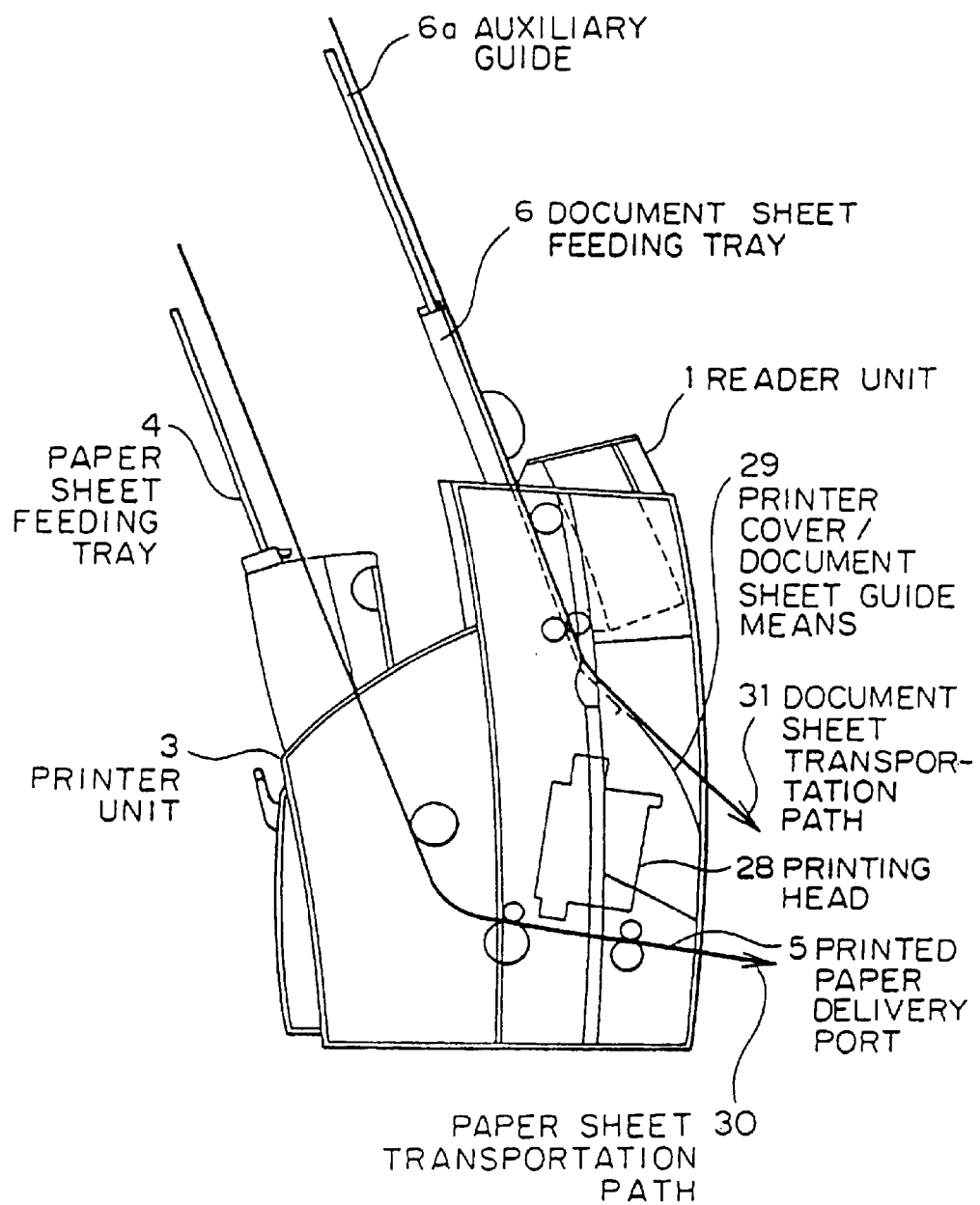
FIG. 8 is a schematic sectional view showing two kinds of sheet transportation paths are provided separately.

FIG. 8 is a schematic sectional view of the printer/scanner combination apparatus in which the two sheet transportation paths (i.e., the paper sheet transportation path and the document sheet transportation path) are provided separately, as mentioned above. In the printer unit 3, the paper sheet placed as a pile at the paper sheet feeding tray 4 for the printer is automatically transported on a sheet-by-sheet basis along the paper sheet transportation path 30 as indicated by an arrow. After having been printed by a printing head 28, the printed paper sheet is discharged from the printed paper delivery port 5. On the other hand, in the scanner unit portion having the reading window 24 mounted on the printer unit, the document sheet placed on the document sheet feeding tray 6 is automatically fed into the reader unit 1 on a sheet-by-sheet basis. The document sheet undergone the reading operation is transported along the document sheet transportation path 31 as indicated by an arrow to be discharged from the document sheet withdrawal port 35.

As can be seen in FIG. 8, the sheet transportation paths for the printer unit and the scanner unit are provided substantially in parallel with each other.

Since the printer unit and the scanner unit of the printer/scanner combination apparatus according to the instant embodiment of the invention are combined together and disposed at rear and front sides (as viewed in FIG. 1) or at left and right sides, respectively, as viewed in FIG. 8, the document sheet feeding tray 6 disposed at the front side (right-hand side as viewed in FIG. 8) may present an obstacle to the setting or positioning of a pile of paper sheets on the paper sheet feeding tray 4 for the printer. To cope with this problem, the document sheet feeding tray 6 should preferably be so implemented as to be pivotally inclined to the front side, as viewed in FIG. 1 (or to the right-hand side, as viewed in FIG. 8) within a predetermined angular range. It should also be noted that the printer cover/document sheet guide means 29 serves not only as the cover for the printing mechanism of the printer unit but also as the guide for the document sheet which has undergone the reading operation by the scanner unit. Consequently, the printer cover/document sheet guide means 29 should preferably be so implemented that it can be inclined toward the front side or removed in order to facilitate the maintenance of the printing mechanism.

Figure 9:
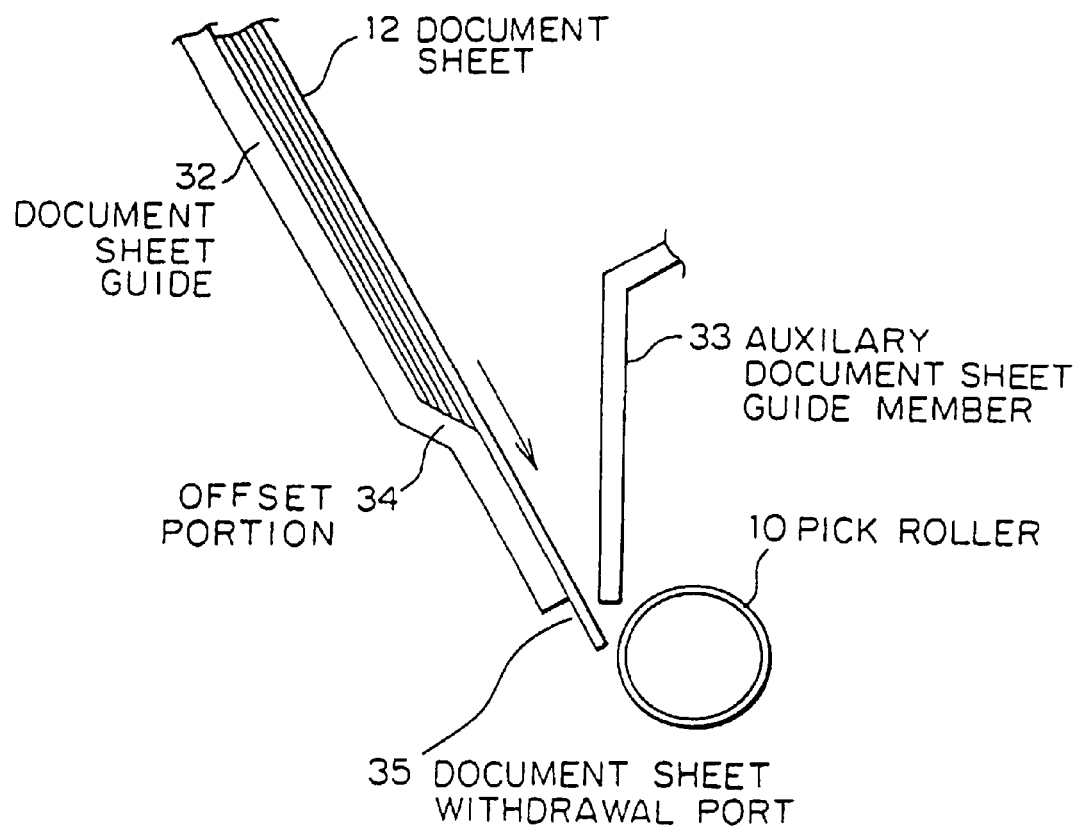
FIG. 9 is a schematic suctional view of a document sheet feeding tray in a printer/scanner combination apparatus according to an embodiment of the present invention.

FIG. 9 is a schematic suctional view of the document sheet feeding tray in the printer/scanner combination apparatus according to the instant embodiment of the invention. Referring to the figure, a document sheet guide 32 and an auxiliary document sheet guide member 33 are disposed in opposition to each other in such orientation that the space defined between the document sheet guide 32 and the auxiliary document sheet guide member 33 becomes narrower gradually toward a document sheet withdrawal port 35. To say in another way, the vertical section of the space between the document sheet guide 32 and the auxiliary document sheet guide member 33 presents substantially a wedge-like shape. By virtue of such arrangement, the document sheet is fed automatically into the printer/scanner combination apparatus essentially on a sheet-by-sheet even when a pile of document sheets is placed on the document sheet feeding tray 6. However, when the number of the document sheets contained in the pile is excessively large, there may take place jamming of the document sheets at or in the vicinity of the document sheet withdrawal port 35 under the weight of the document sheets as piled. To evade this problem, the document sheet guide 32 should preferably be provided with an offset portion 34 in order to prevent the load of all the document sheets piled from being concentrated to the document sheet withdrawal port 35. In this conjunction, it should be noted that a plurality of such offset portions 34 may be provided although only one offset portion 34 is shown in FIG. 9. Additionally, such offset portion may be provided in the auxiliary document sheet guide member 33 as well. Parenthetically, the offset portion is imparted with a lenient inclination so that the document sheet can slidably move downwardly to the document sheet withdrawal port 35.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the printer/scanner combination apparatus described above, the driving motor 8 and the feed rollers 11 are incorporated in the reader unit 1 so that the reader unit 1 can be operated independently. However, the present invention is never restricted to the implementation of the reader unit 1 in the form of the handy scanner which can be operated automatically. Furthermore, the driving mechanism may be incorporated in the base unit (printer unit) with the reader unit 1 being constituted by the following roller and the position detecting encoder. In that case, the reader unit can be implemented in a miniaturized structure of light weight. When the handy scanner is manipulated on the guide plate, the cable is likely to provide an obstacle to the manipulation or operation of the handy scanner. Accordingly, the cable interconnecting the reader unit 1 and the printer unit 3 may preferably be secured to lower side portions of the reader unit 1 and the printer unit 3, respectively, while a cable clamp member for securing the cable to the guide plate may be provided in association with the latter.

Accordingly, all suitable modifications and equivalents may be resorted to, falling within the spirit and scope of the invention.

As will now be apparent from the foregoing description, it is possible to combine the scanner unit with a base unit such as a printer unit, personal computer, word processor or the like incorporating a printer unit so that the printer unit and the scanner unit can be operated independent of each other. Thus, the space required for installing the base unit and the scanner unit can be reduced significantly. Besides, the scanner unit can be easily detached or removed from the base unit and used as an automatically or manually operated handy scanner essentially without need for provision of any additional means. Thus, the utility efficiency of the printer/scanner combination apparatus can be enhanced remarkably as a whole nevertheless of low manufacturing cost.

What is claimed is:

1. A multiple function apparatus, comprising:
    a first transporting guide being formed so as to transport a first sheet;
    a second transporting guide, provided along said first transporting guide, including a straight guide part and a deflecting guide part, said straight guide part being formed so as to transport a second sheet straight and is open at one end, and said deflecting guide part being connected to said straight guide part at a side opposite said one end so as to transport a second sheet in a direction different from a direction of transport effected by said straight guide part;
    a first apparatus provided in a space between said deflecting guide part and said first transporting guide and performing processing for said first sheet in a case where said first sheet is transported along said first transporting guide; and
    a second apparatus provided at said straight guide part, and performing processing for said second sheet in a case where said second sheet is transported along said straight guide part;
    wherein said first transporting guide is provided opposite a direction of deflection effected by said deflecting guide part with respect to said straight guide portion, and said deflecting guide part is disposed over said first apparatus;
    wherein a direction of transport of said first sheet effected by a portion of said first transporting guide which faces to said straight guide part of said second transporting guide and a direction of transport of said second sheet effected by said straight guide part form an angle smaller than 90 degrees with the vertical direction in a case where said multiple function apparatus is provided for use:
    a first transporting mechanism transporting said first sheet by said first transporting guide;
    a second transporting mechanism transporting said second sheed from said straight guide part of said second transporting guide toward said deflecting guide part in a manner that said second sheet is transported in a same direction is said first sheet;
    a first sheet delivery port for delivery of said first sheet from said multiple function apparatus, said first sheet delivery port being provided at a location downstream of said first transporting guide as viewed in a direction of transport of said first sheet;
    a second sheet delivery port for delivery of said second sheet from said multiple function apparatus, said second delivery port being provided at a location downstream of said deflecting guide part as viewed in a direction of transport of sad second sheet;
    wherein said first and second sheet delivery ports are provided at a same side of said multiple function apparatus.

2. A multiple function apparatus according to claim 1, wherein said second apparatus is provided opposite of said first transporting guide with respect to said straight guide part.

3. A multiple function apparatus according to claim 1, wherein said second transporting guide is provided closer on the front side of said multiple function apparatus than is said first transporting guide, said first apparatus is an image forming apparatus, said second apparatus is a scanner, a sheet accommodating part is provided at a location a location upstream of said first transporting guide as viewed in said sheet transporting direction, said sheet accommodating part accommodates a plurality of sheets to be fed to said first transporting guide.

4. A multiple function apparatus according to claim 3, wherein said deflecting guide part serves as a part of a cover of said multiple function apparatus and covers said image forming apparatus.

5. A multiple function apparatus according to claim 3, wherein said deflecting guide is a part is movable, so that image forming apparatus can be exposed.

6. A multiple function apparatus according to claim 3, wherein said first apparatus and said second apparatus are provided in such a positional relation as to overlap each other in the vertical direction in a case where said multiple function apparatus is in use.

7. A multiple function apparatus according to claim 1, wherein an upper part of the first transporting guide is at an upstream position in a sheet stream direction than a lower part of the first transporting guide, and an upper part of the second transporting guide is located upstream from a lower part of the second transporting guide.

8. A multiple function apparatus according to claim 7, the second apparatus is a scanner which is detachable from the multiple function apparatus and used as a handy scanner, when described from the multiple function apparatus.

9. A multiple function device comprising:

a housing a first transporting guide arranged in said housing and transportinga first sheet, said first transporting guide including a straight guide part and a deflecting guide part connected to said straight guide part;

a second transporting guide arranged in said housing and including a straight guide part and a deflecting guide part, said straight guide part being formed to transport a second sheet straight in a straight guide direction and said straight guide having an open end, said deflecting guide part being connected to said straight guide part at a side opposite said open end so as to transport the second sheet in a deflection direction different from said straight guide direction;

a first apparatus provided in a space of said housing between said deflecting guide part of said second transporting guide and said first transporting guide, said first apparatus processing said first sheet when the first sheet is transported along said first transporting guide;

a second apparatus provided at said straight guide part of said second transporting guide, said second apparatus processing the second sheet when the second sheet is transported along said straight guide part of said second transporting guide;

said first transporting guidebeing arranged on a side of said straight guide portion of said second transporting guide diametrically opposite said deflecting guide part of said second transporting guide, said deflecting guide part of said second transporting guide being arranged over said first apparatus;

wherein a direction of transport of said straight guide parts of said first and second transporting guides form an angle smaller than 90 degrees with a vertical direction and are in a same direction;

a first sheet delivery port in said housing for delivery of the first sheet from said first transporting guide;

a second sheet delivery port in saaid housing for delivery of said second sheet from said second transporting guide, said first and second sheet delivery ports being arranged at a same side of said housing.

10. A device in accordance with claim 9, wherein:

said first transporting guide transports the first sheet from said straight guide part to said deflecting guide part of said first transporting guide;

said second transporting guide transports the second sheet from said straight guide part to said deflecting guide part of said second transporting guide.

* * * * *

UNITED STATES PATENT AND TRADEMARK OFFICE
CERTIFICATE OF CORRECTION

PATENT NO. : 7,133,169 B2 Page 1 of 1
APPLICATION NO. : 09/881529
DATED : November 7, 2006
INVENTOR(S) : Terashima et al.

It is certified that error appears in the above-identified patent and that said Letters Patent is hereby corrected as shown below:

On the Title Page, Item (73) should read,

(73) Assignee: PFU LIMITED (50%)
-and-
FUJITSU LIMITED (50%)

Signed and Sealed this

Twenty-third Day of June, 2009

JOHN DOLL
*Acting Director of the United States Patent and Trademark Office*